United States Patent
Cho et al.

(10) Patent No.: US 9,829,197 B2
(45) Date of Patent: Nov. 28, 2017

(54) PRESSURE-SENSOR-INTEGRATED GLOW PLUG AND MANUFACTURING METHOD THEREOF

(71) Applicant: Bosch Corporation, Tokyo (JP)

(72) Inventors: Kan Cho, Saitama (JP); Yasuo Toyoshima, Saitama (JP)

(73) Assignee: Bosch Corporation, Tokyo (JP)

( * ) Notice: Subject to any disclaimer, the term of this patent is extended or adjusted under 35 U.S.C. 154(b) by 219 days.

(21) Appl. No.: 14/766,529

(22) PCT Filed: Jan. 16, 2014

(86) PCT No.: PCT/JP2014/050620
§ 371 (c)(1),
(2) Date: Aug. 7, 2015

(87) PCT Pub. No.: WO2014/122957
PCT Pub. Date: Aug. 14, 2014

(65) Prior Publication Data
US 2015/0369485 A1 Dec. 24, 2015

(30) Foreign Application Priority Data
Feb. 8, 2013 (JP) .................. 2013-023202

(51) Int. Cl.
*F23Q 7/00* (2006.01)
*G01L 23/22* (2006.01)
(Continued)

(52) U.S. Cl.
CPC ............. *F23Q 7/001* (2013.01); *G01L 23/22* (2013.01); *H05B 3/0014* (2013.01); *H05B 3/04* (2013.01);
(Continued)

(58) Field of Classification Search
None
See application file for complete search history.

(56) References Cited

U.S. PATENT DOCUMENTS

| 7,581,520 B2 * | 9/2009 | Kern ................. G01L 23/22 123/145 A |
| 8,003,917 B2 * | 8/2011 | Kern ................. F23Q 7/001 219/260 |

(Continued)

FOREIGN PATENT DOCUMENTS

| JP | 200963256 | 3/2009 |
| JP | 2009520942 | 5/2009 |
| JP | 201223019 | 2/2012 |

OTHER PUBLICATIONS

International Search Report for Application No. PCT/JP2014/050620 dated Feb. 18, 2014 (English Translation, 2 pages).

*Primary Examiner* — Joseph M Pelham
(74) *Attorney, Agent, or Firm* — Michael Best & Friedrich LLP

(57) ABSTRACT

A pressure-sensor-integrated glow plug which can increase reliability of a bonding portion between a ceramic heater and a metal-made outer sleeve while being manufactured with relatively simple manufacturing steps and, at the same time, can maintain airtightness over a long period, and a method of manufacturing such a pressure-sensor-integrated glow plug.

6 Claims, 1 Drawing Sheet

(51) Int. Cl.
   *H05B 3/00*   (2006.01)
   *H05B 3/04*   (2006.01)
   *H05B 3/06*   (2006.01)
   *H05B 3/14*   (2006.01)

(52) U.S. Cl.
   CPC .............. *H05B 3/06* (2013.01); *H05B 3/141* (2013.01); *F23Q 2007/002* (2013.01); *F23Q 2007/004* (2013.01); *F23Q 2007/005* (2013.01); *H05B 2203/027* (2013.01)

(56) References Cited

U.S. PATENT DOCUMENTS

| | | | | |
|---|---|---|---|---|
| 2005/0061063 | A1* | 3/2005 | Haussner | F23Q 7/001 73/114.18 |
| 2006/0053875 | A1* | 3/2006 | Haussner | F23Q 7/001 73/114.19 |
| 2007/0289370 | A1* | 12/2007 | Hirose | F23Q 7/001 73/114.21 |
| 2009/0025468 | A1* | 1/2009 | Flik | G01L 23/10 73/114.18 |
| 2009/0056660 | A1* | 3/2009 | Goto | F23Q 7/001 123/145 A |
| 2009/0165739 | A1* | 7/2009 | Kern | F23Q 7/001 123/145 R |
| 2009/0321408 | A1* | 12/2009 | Kern | F23Q 7/001 219/270 |
| 2010/0229624 | A1* | 9/2010 | Higuchi | F02D 35/023 73/1.57 |
| 2011/0005308 | A1* | 1/2011 | Kern | F23Q 7/001 73/114.16 |
| 2011/0215080 | A1 | 9/2011 | Rainer et al. | |
| 2013/0269640 | A1* | 10/2013 | Nakamura | F02P 19/028 123/145 A |
| 2013/0319094 | A1* | 12/2013 | Nakamura | G01M 15/08 73/114.19 |
| 2015/0027213 | A1* | 1/2015 | Maier-Schleich | G01L 19/0645 73/114.18 |
| 2015/0300643 | A1* | 10/2015 | Takatsu | F23Q 7/001 219/209 |
| 2015/0334777 | A1* | 11/2015 | Sassa | G01L 9/0051 219/201 |
| 2016/0076971 | A1* | 3/2016 | Hirokawa | F23Q 7/001 73/114.18 |

* cited by examiner

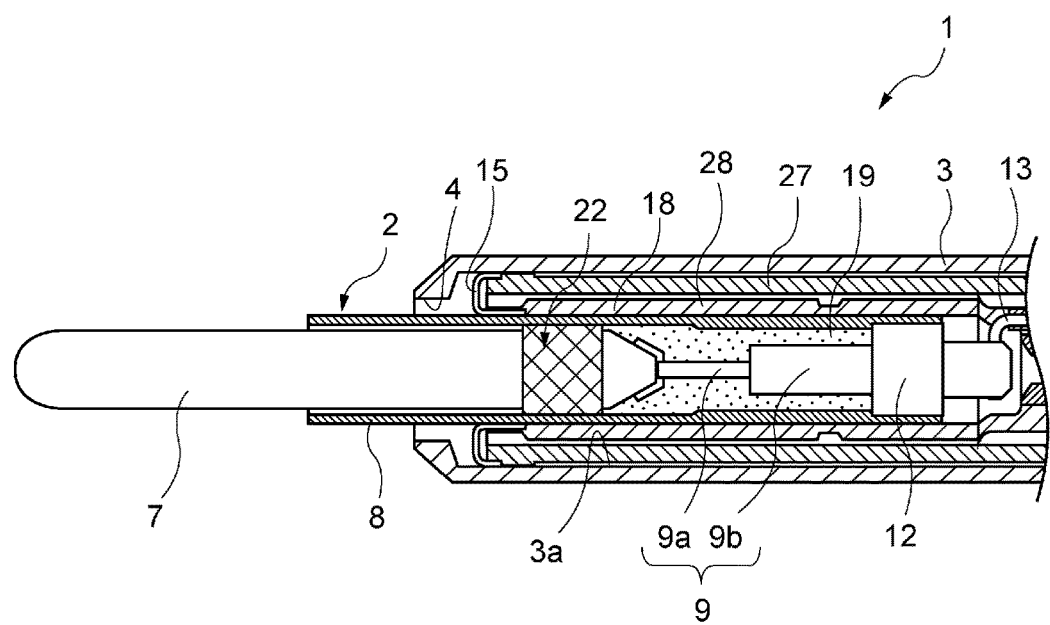

PRESSURE-SENSOR-INTEGRATED GLOW PLUG AND MANUFACTURING METHOD THEREOF

BACKGROUND OF THE INVENTION

The present invention relates to a pressure-sensor-integrated glow plug where a pressure sensor for detecting a cylinder inner pressure is integrally mounted on a sheath type glow plug used for assisting starting of a diesel engine, and a method of manufacturing the pressure-sensor-integrated glow plug.

Conventionally, in a diesel engine which is a self-ignition-type internal combustion engine, a ceramic heater type glow plug where a heat generating part is formed of a ceramic material is disposed in the inside of a combustion chamber. Recently, a pressure-sensor-integrated glow plug where a pressure sensor for detecting a cylinder inner pressure and a glow plug are integrally formed with each other has been put into a practical use.

For example, a ceramic heater type glow plug includes: a housing inserted into the inside of a combustion chamber; a ceramic heater element having a distal end thereof projecting from the housing and held on the housing; and a pressure sensor arranged between the ceramic heater element and the housing. The pressure sensor-integrated glow plug is configured such that the ceramic heater element is held on the housing by means of a flexible member such as a diaphragm, the ceramic heater element is displaced in an axial direction in the housing due to a cylinder inner pressure, and the pressure sensor can detect the cylinder inner pressure based on this displacement.

The ceramic heater element includes: a ceramic heater; a metal-made outer sleeve holding the ceramic heater on one end side thereof and having the other end side thereof inserted into and fixed to an inner hole of the housing; and a conductor portion electrically connected to an electrode of the ceramic heater and led out to the other end side of the metal-made outer sleeve. In the pressure-sensor-integrated glow plug provided with such a ceramic heater element, a gap formed between the ceramic heater element and the housing is sealed in an airtight manner with respect to the combustion chamber by the flexible member, and the airtightness in the ceramic heater element is ensured by bonding the metal-made outer sleeve and the ceramic heater to each other. Due to such a constitution, for example, it is possible to prevent the occurrence of a drawback such as breaking of an electronic printed circuit board mounted on a rear end side of the housing due to soot in an exhaust gas or the like.

With only the bonding portion between the ceramic heater and the metal-made outer sleeve, the bonding portion is deteriorated due to a thermal load in the combustion chamber so that airtightness is reduced. In view of the above, there has been disclosed a glow plug where a metal material having a low thermal expansion coefficient is used for forming a seal element, and the seal element is bonded to a metal-made outer sleeve so as to ensure airtightness (see JP-T-2010-521645, for example).

SUMMARY OF THE INVENTION

However, the glow plug described in JP-T-2010-521645 has a possibility that a step of bonding the seal element and the metal-made outer sleeve will become complicated. Further, in the glow plug described in JP-T-2010-521645, the bonding portion between the seal element and the metal-made outer sleeve is positioned in an outer region of the housing and hence, the bonding portion is likely to be exposed to a high temperature of a combustion chamber whereby there is a possibility that durability of the bonding portion cannot be sufficiently ensured.

The invention has been made to overcome such a drawback, and it is an object of the invention to provide a pressure-sensor-integrated glow plug which can increase reliability of a bonding portion between a ceramic heater and a metal-made outer sleeve while being manufactured with relatively simple manufacturing steps and, at the same time, can maintain airtightness over a long period, and a method of manufacturing such a pressure-sensor-integrated glow plug.

According to the invention, there is provided a pressure-sensor-integrated glow plug used by being inserted into the inside of a combustion chamber of an internal combustion engine, the pressure-sensor-integrated glow plug including: a housing; a rod-shaped ceramic heater element having a distal end thereof projecting from the housing and held on the housing; and a pressure sensor, wherein the ceramic heater element is held on the housing by a metal-made flexible member and has a position thereof displaceable with respect to the housing, and the pressure sensor receives a pressure in the combustion chamber in response to a displacement of the ceramic heater element, wherein the ceramic heater element includes: a ceramic heater; a metal-made outer sleeve holding the ceramic heater on one end side thereof and having the other end side thereof inserted into and fixed to an inner hole of the housing; and a conductor portion electrically connected to one electrode of the ceramic heater and led out to the other end side of the metal-made outer sleeve, and the metal-made outer sleeve is sealed with respect to the combustion chamber, and the seal is provided on a more rear end side than at least the flexible member in an axial direction of the ceramic heater element. Due to the above-mentioned constitution, it is possible to overcome the above-mentioned drawback.

That is, in the pressure-sensor-integrated glow plug of the invention, the seal is provided in the low temperature environment on a more rear end side than the metal-made flexible member which holds the ceramic heater element on the housing. Accordingly, it is possible to reduce a possibility that the seal is deteriorated due to a high-temperature in the combustion chamber and loses airtightness.

In forming the pressure-sensor-integrated glow plug of the invention, it is preferable that the seal be formed of a bonding portion which electrically connects the other electrode mounted on an outer peripheral surface of the ceramic heater and the metal-made outer sleeve to each other, and bonds the ceramic heater and the metal-made outer sleeve to each other. By making use of the bonding portion as the seal in this manner, it is possible to ensure airtightness by the seal having a small possibility of thermal deterioration without using another seal ring or the like.

In forming the pressure-sensor-integrated glow plug of the invention, it is preferable that the conductor portion have a small diameter portion. With a provision of such a conductor portion having the small diameter portion, even when the ceramic heater or the like is thermally expanded under a high temperature environment, a stress caused by thermal expansion can be alleviated by the small diameter portion. Accordingly, it is possible to reduce a possibility that the bonding portion between the conductor portion and the ceramic heater is broken due to the stress.

BRIEF DESCRIPTION OF THE DRAWING

FIG. 1 is a partial cross-sectional view showing a portion of a pressure-sensor-integrated glow plug according to an embodiment of the invention on a distal end side.

DETAILED DESCRIPTION

Hereinafter, an embodiment relating to a pressure-sensor-integrated glow plug according to the invention is specifically explained by reference to a drawing.

The pressure-sensor-integrated glow plug and a manufacturing method thereof explained hereinafter merely constitute one mode of the invention, do not limit the invention, and can be arbitrarily changed within the scope of the invention. The constitutional elements to which the same symbol is applied in the respective drawings are the identical constitutional element unless otherwise explained, and the explanation of the constitutional element is omitted when appropriate.

FIG. 1 is a cross-sectional view taken along an axial direction of a pressure-sensor-integrated glow plug (hereinafter simply referred to as "glow plug") 1 according to the embodiment of the invention, wherein a distal end side of the glow plug is partially shown.

The glow plug 1 shown in FIG. 1 is formed as a sheath-type glow plug where a ceramic heater 7 is held on a distal end side of a metal-made outer sleeve 8, and a rear end side of the metal-made outer sleeve 8 is held in the inside of an inner hole 3a of a housing 3. For example, the glow plug 1 is formed as a so-called glow plug 1 used in a self-ignition-type internal combustion engine such as a diesel engine.

The glow plug 1 includes a rod-shaped ceramic heater element 2. When the glow plug 1 is used in a pre-combustion type internal combustion engine, the ceramic heater element 2 is inserted into and fixed to a pre-combustion chamber, while when the glow plug 1 is used in a direct injection type internal combustion engine, the ceramic heater element 2 is inserted into and fixed to a combustion chamber of the internal combustion engine. In this disclosure, "combustion chamber" means not only a combustion chamber but also a pre-combustion chamber. The ceramic heater element 2 is formed as a ceramic heater element 2 which includes a ceramic heater 7 which is made of ceramic and constitutes a heat generating portion.

The glow plug 1 includes a housing 3. The housing 3 is preferably made of a metal material. The housing 3 has the inner hole 3a concentric with the housing 3. A rear end side of the ceramic heater element 2 is partially arranged in the inner hole 3a of the housing 3, and can be projected into the inside of the combustion chamber of the internal combustion engine from the housing 3 through an opening 4 formed on a distal end side of the housing 3.

The rod-shaped ceramic heater element 2 used in this embodiment includes: the ceramic heater 7; a metal-made outer sleeve 8; and a conductor portion 9. The conductor portion 9 is made of a conductive material such as metal, and is formed of a small diameter portion 9a and a large diameter portion 9b. To be more specific, the conductor portion 9 formed of the small diameter portion 9a and the large diameter portion 9b is formed by inserting a connecting wire which constitutes the small diameter portion 9a into the inside of an electrode center which constitutes the large diameter portion 9b.

A distal end portion of the small diameter portion 9a is formed into a cap shape, and is electrically connected to a positive electrode formed on a rear end portion of the ceramic heater 7. The conductor portion 9 is fixed in the inside of the metal-made outer sleeve 8 by filling insulating granular powder 19 in the metal-made outer sleeve 8 and by applying swaging to the metal-made outer sleeve 8. By forming the small diameter portion 9a as a part of the conductor portion 9, even when the ceramic heater 7 or the metal-made outer sleeve 8 is thermally expanded under a high temperature environment in the inside of the combustion chamber, a stress caused by thermal expansion can be alleviated by the small diameter portion 9a. Accordingly, it is possible to reduce a possibility that a bonding portion between the conductor portion 9 and the ceramic heater 7 is broken due to the stress.

The large diameter portion 9b of the conductor portion 9 is connected to an electric wire 13, and the electric wire 13 is led out to a rear end side of the housing 3. The large diameter portion 9b which forms a part of the conductor portion 9 on rear end side is fixed to a rear end portion of the metal-made outer sleeve 8 by being held by an electrically insulated fixing member 12. The fixing member 12 is made of an elastic material such as Viton, and also has a function of sealing the insulating granular powder 19 in the inside of the metal-made outer sleeve 8.

The ceramic heater element 2 and a fixing cylinder member 27 to which a pressure sensor not shown in the drawing is fixed are inserted into and fixed in the through hole 3a of the housing 3. The ceramic heater element 2 is connected to the fixing cylinder member 27 by way of a steel diaphragm constituting a metal-made flexible member 15 having flexibility which is connected to a distal end side of the fixing cylinder member 27. That is, one side of the steel diaphragm constituting the flexible member 15 is connected to the housing 3, and the other side of the steel diaphragm is connected to the metal-made outer sleeve 8 of the ceramic heater element 2 at the annular cylindrical portion 18. The flexible member 15 is formed with flexibility such that the ceramic heater element 2 is movable relative to the housing 3 in the axial direction of the housing 3 of the glow plug 1.

The metal-made flexible member 15 having flexibility is not limited to a steel diaphragm, and may be formed of a flexible member 15 used in a conventionally known pressure-sensor-integrated glow plug such as a bellows.

The pressure sensor not shown in the drawing is arranged in the inside of a portion of the fixing cylinder member 27 on a rear end side. This pressure sensor may be formed of a piezoelectric sensor element, for example. The piezoelectric sensor element generates an electric charge when a mechanical load is applied to the piezoelectric sensor element, and the electric charge may be detected in a contact region of the pressure sensor. The detected electric charge is led out from the housing 3 of the glow plug 1 through an electric wire or the like. The pressure sensor is fixed to the fixing cylinder member 27 connected to the housing 3 at a side (rear end side) thereof remoter from the combustion chamber or the like. On the other hand, the pressure sensor is connected to the ceramic heater element 2 by way of a power transmission sleeve 28. In this case, the ceramic heater element 2 is supported on the power transmission sleeve 28 mainly at the metal-made outer sleeve 8 of the ceramic heater element 2.

In a state where the glow plug 1 is assembled to an internal combustion engine, a force which acts on the ceramic heater element 2 is generated due to a pressure in the inside of the combustion chamber of the internal combustion engine. The force acts on the ceramic heater element 2 in the axial direction of the glow plug 1. The force is transmitted to the pressure sensor through the power transmission sleeve 28. The pressure sensor outputs a detection signal through the electric wire or the like corresponding to the transmitted force, and a pressure generated in the combustion chamber or the like is measured based on the detection signal. To measure a pressure generated in the inside of the combustion chamber with high accuracy, it is necessary to ensure a state where the ceramic heater element 2 and the power transmission sleeve 28 are freely movable in the axial direction without being constrained by the housing 3.

On the other hand, to prevent a temperature of a brazing material used for bonding constitutional members and a temperature of the conductor portion 9 from being extremely elevated and exceeding a heat-resistant temperature, it is necessary to radiate heat generated by the ceramic heater element 2 by efficiently transmitting the heat to the housing 3. The glow plug 1 according to this embodiment is configured such that heat generated in the ceramic heater 7 is released to the housing 3 through the metal-made flexible member 15.

The glow plug 1 according to this embodiment adopts the seal structure which prevents the intrusion of an exhaust gas generated in the combustion chamber into a rear end side of the glow plug 1. Outside the ceramic heater element 2, the flexible member 15 is bonded to the metal-made outer sleeve 8 and the housing 3 thus ensuring airtightness of the glow plug 1 with respect to the combustion chamber. On the other hand, inside the metal-made outer sleeve 8, the bonding portion 22 between the ceramic heater 7 and the metal-made outer sleeve 8 functions as a sealing portion so that airtightness of the glow plug 1 with respect to the combustion chamber is ensured.

The bonding portion 22 which functions as the seal is provided on a more rear end side than a position where the flexible member 15 is disposed, and seals a gap formed between the metal-made outer sleeve 8 and the ceramic heater 7. To be more specific, the bonding portion 22 is formed by bonding a whole circumferential portion of a region including a negative electrode formed on an outer peripheral surface of the ceramic heater 7 and an inner peripheral surface of the metal-made outer sleeve 8 using a brazing material. That is, the bonding portion 22 electrically connects the negative electrode of the ceramic heater 7 and the metal-made outer sleeve 8 to each other, and also bonds the ceramic heater 7 and the metal-made outer sleeve 8 to each other. In this embodiment, the bonding portion 22 is bonded and is sealed to the metal-made outer sleeve 8 over the whole circumference of the outer peripheral surface of the ceramic heater 7.

Although silver solder (BAg8) may be used as a brazing material for bonding the ceramic heater 7 and the metal-made outer sleeve 8 to each other, for example. However, the brazing material is not limited to silver solder.

As has been described above, in the glow plug 1 according to this embodiment, the bonding portion 22 which functions as the seal is disposed on a more rear end side than the flexible member 15 having a function of transmitting heat of the ceramic heater element 2 to the housing 3 and hence, the bonding portion 22 is disposed away from the combustion chamber. Accordingly, the bonding portion 22 is positioned in a low temperature environment and hence, a possibility that the bonding portion 22 is thermally degraded is low whereby the bonding portion 22 can maintain a sealing property over a long period.

Further, in the glow plug 1 according to this embodiment, the conductor portion 9 has the small diameter portion 9a and hence, even when the ceramic heater 7 or the like is thermally expanded under a high temperature environment, a stress caused by thermal expansion can be alleviated by the small diameter portion 9a. Accordingly, it is possible to reduce a possibility that the bonding portion between the conductor portion 9 and the ceramic heater 7 is broken due to the stress.

The invention claimed is:

1. A pressure-sensor-integrated glow plug configured to be inserted into an inside of a combustion chamber of an internal combustion engine, the pressure-sensor-integrated glow plug comprising: a housing; a rod-shaped ceramic heater element having a distal end projecting from a front axial end of the housing and held in the housing; and a pressure sensor, wherein the ceramic heater element is held in the housing by a metal-made flexible member and has a position displaceable with respect to the housing, and the pressure sensor receives a pressure in the combustion chamber in response to a displacement of the ceramic heater element, wherein the ceramic heater element includes: a ceramic heater; a metal-made outer sleeve holding the ceramic heater on one end thereof and having the other end thereof inserted into and fixed to an inner hole of the housing; and a conductor portion electrically connected to one electrode of the ceramic heater and led out to the other end of the metal-made outer sleeve, and a seal is formed to seal a gap between the ceramic heater and the metal-made outer sleeve to seal an interior of the pressure-sensor-integrated glow plug with respect to the combustion chamber, and the seal is provided further from the front axial end than at least the flexible member in an axial direction of the ceramic heater element, and wherein the pressure sensor is fixed to a fixing cylinder member, which is connected to the housing, and pressure in the combustion chamber is transmitted to the pressure sensor through a power transmission sleeve that holds the metal-made outer sleeve therein.

2. The pressure-sensor-integrated glow plug according to claim 1, wherein the seal is formed of a bonding portion which electrically connects an other electrode mounted on an outer peripheral surface of the ceramic heater and the metal-made outer sleeve to each other, and bonds the ceramic heater and the metal-made outer sleeve to each other.

3. The pressure-sensor-integrated glow plug according to claim 1, wherein the conductor portion has a first conductor portion and a second conductor portion, the first conductor portion extending between the electrode and the second conductor portion and having a smaller diameter than the second conductor portion.

4. The pressure-sensor-integrated glow plug according to claim 2, wherein the conductor portion has a first conductor portion and a second conductor portion, the first conductor portion extending between the electrode and the second conductor portion and having a smaller diameter than the second conductor portion.

5. The pressure-sensor-integrated glow plug according to claim 3, wherein the first conductor portion is formed as a wire, and the second conductor portion forms an electrode fixed with respect to the metal-made outer sleeve.

6. The pressure-sensor-integrated glow plug according to claim 4, wherein the first conductor portion is formed as a wire, and the second conductor portion forms an electrode fixed with respect to the metal-made outer sleeve.

* * * * *